May 25, 1954 W. W. SYMONDS 2,679,227
AUTOMATIC DIVING DEVICE
Filed Oct. 21, 1952 3 Sheets-Sheet 1

INVENTOR.
William W. Symonds.
BY
Henway Jenney, Witter & Hildreth.
Attys.

May 25, 1954  W. W. SYMONDS  2,679,227
AUTOMATIC DIVING DEVICE

Filed Oct. 21, 1952  3 Sheets-Sheet 2

INVENTOR.
William W. Symonds.
BY
Kenway, Jenney, Witter & Hildreth.
Attys.

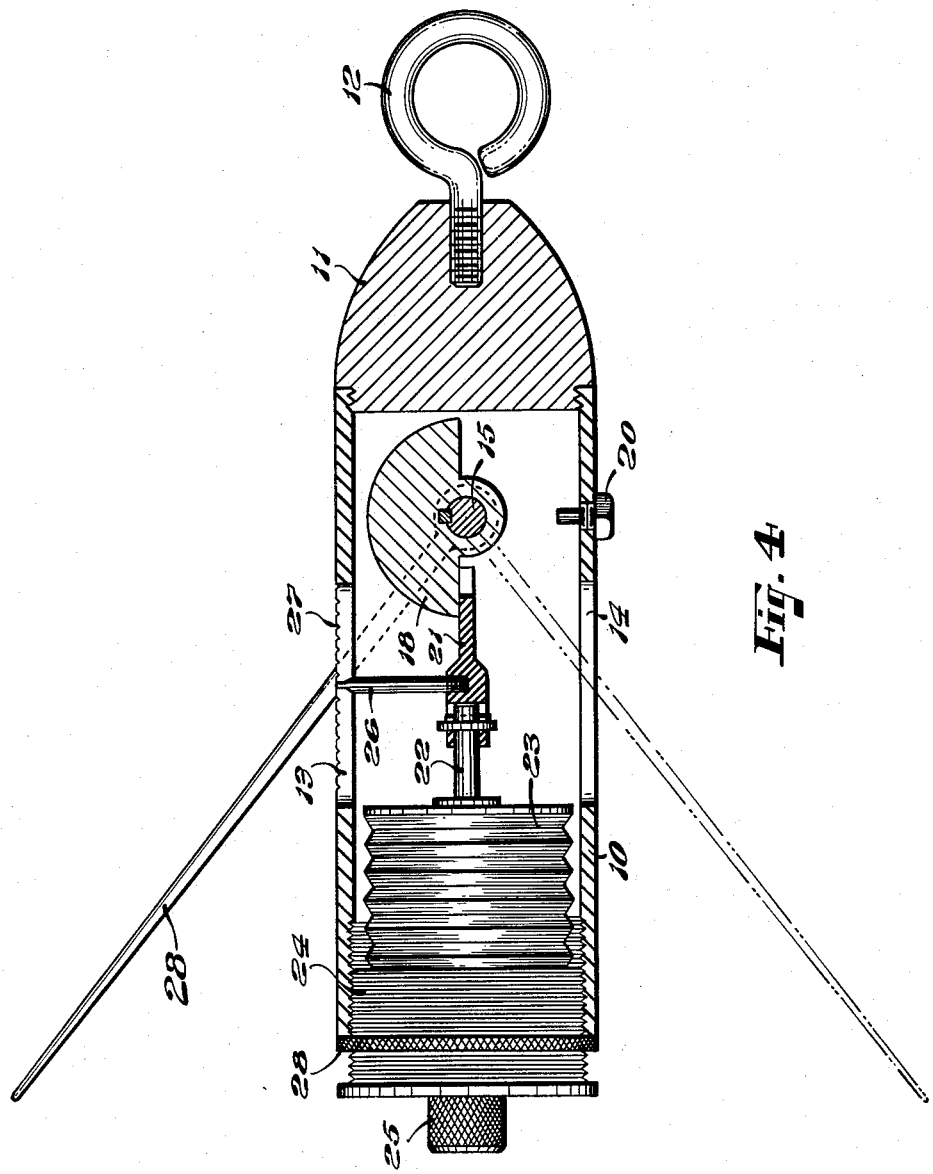

Patented May 25, 1954

2,679,227

UNITED STATES PATENT OFFICE 2,679,227

AUTOMATIC DIVING DEVICE

William W. Symonds, Marblehead, Mass., assignor to New England Trawler Equipment Co., Chelsea, Mass., a corporation of Massachusetts Application October 21, 1952, Serial No. 315,867

4 Claims. (Cl. 114—235)

This invention comprises a diving device for leading submersible instruments as they are lowered or payed out from a moving vessel. An important field of use of the improved device is in connection with bathythermographs such as that disclosed in United States Letters Patent No. 2,297,725 dated October 6, 1942 to Spilhaus. It is extremely important in submarine signaling for the operator to have an accurate knowledge of the temperature of the water at the different levels through which the signal is to be transmitted. The function of a bathythermograph is to provide a graph or curve of temperature plotted against depth from the point of the deepest submergence of the instrument to the surface of the sea. Ordinarily the bathythermograph is payed out from the stern of the vessel at approximately the surface speed of the vessel, but owing to the buoyancy or planing effect of the wire, the bathythermograph is uncertain and slow in reaching the desired depth. The object of the present invention is to provide a device that will cause the bathythermograph to dive promptly to the desired depth, and after having reached that point, to ascend again as promptly to the surface.

In a preferred embodiment the automatic diving device of my invention comprises an elongated body having a towing connection at one end and carrying a pair of external vanes which are angularly adjustable with respect to the axis of the body from a position of descending or diving action to a position of rising or ascending angle, together with means for altering the angular position of the vanes under the control of pressure-responsive means such, for example, as metal bellows of thin flexible material.

Going more into detail, the device of my invention includes a spring and a stop located within the body of the device for holding the vanes at an ascending angle with respect to the body, and pressure-controlled means for holding the vanes at a descending angle which are arranged to become active or to be tripped off when the device reaches a predetermined depth. Accordingly, it is proposed to heave overboard the bathythermograph together with the diving device with the vanes of the latter set for the descending angle. As the vessel moves ahead, or as the line or wire moves angularly through the water, the instrument is promptly carried down to the desired level. When that point is reached the pressure-responsive means comes into action, the latch is tripped, the vanes are moved to their ascending angle position, and the device is rapidly brought to the surface where its depth-temperature graph may be immediately secured and inspected.

The device of my invention is preferably provided with means for adjusting the action of its pressure-sensitive mechanism. As herein shown one way in which this may be effected is by mounting a helical compression spring in parallel with the bellows in such a manner that the amount of compression in the spring may be varied so as to increase or decrease the force necessary to retract a latch releasing the vanes for movement into their ascending position. In other words the spring may be adjusted so that a predetermined depth below the surface of the water (and consequently a specific hydrostatic pressure and specific force acting on the bellows), must be reached before the device will ascend to the surface.

These and other features of the invention will be best understood and appreciated from the following description of a preferred embodiment thereof, selected for purposes of illustration and shown in the accompanying drawings in which:

Fig. 4 is a similar view of a device of modified construction.

Figure 1:
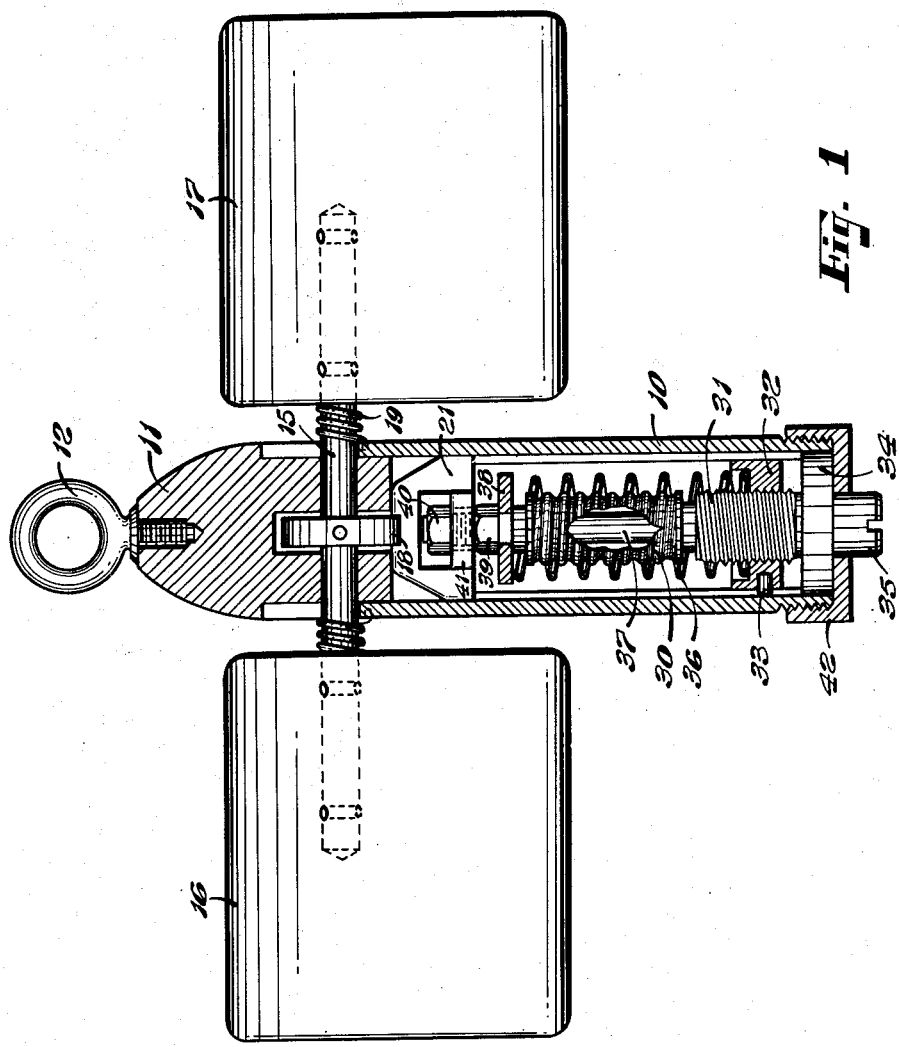
Fig. 1 is a plan view of the device shown partly in longitudinal section.
Figure 2:
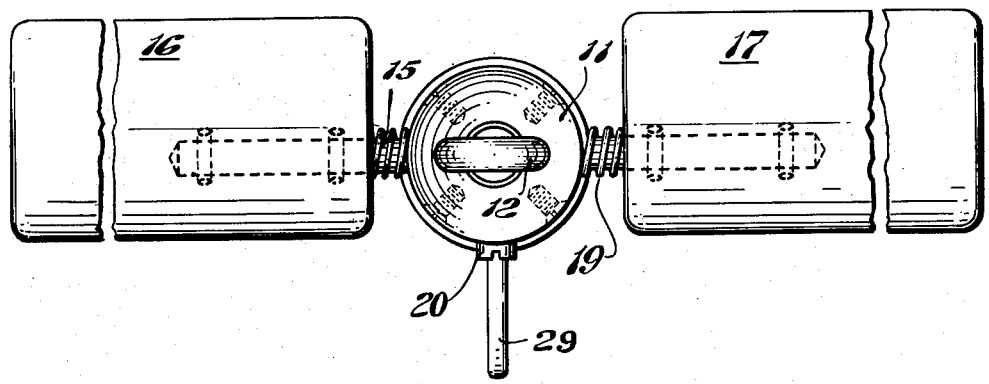
Fig. 2 is a front end view.

As herein shown the device has a bullet-shaped body comprising a cylindrical shell 10 and a solid conical nose 11 into which is threaded a towing eye 12. The shell 10 is provided with a longitudinal slot 13 so that the hollow interior of the device is filled and subjected to full liquid pressure when submerged. The body is also equipped with a stabilizing keel or fin 14 which may be weighted if desired.

A transverse shaft 15 is journaled in the nose and projects out through slots in the walls of the shell and to its projecting arms are fastened vanes or hydrofoils 16 and 17. A solid segment 18 is pinned to the shaft and arranged to rock in a slot provided for that purpose in the solid nose 11. Tortion springs 19 surround the shaft 15 between the shell and the vanes and tend at all times to rotate the shaft and the segment 18 in a counter-clockwise direction when viewed as in Fig. 3. The segment 18 is substantially semi-circular in contour and is arranged to strike an adjustable stop 20 set in the wall of the shell 10 and extending inwardly into the path of oscillation of the segment 18.

Figure 3:
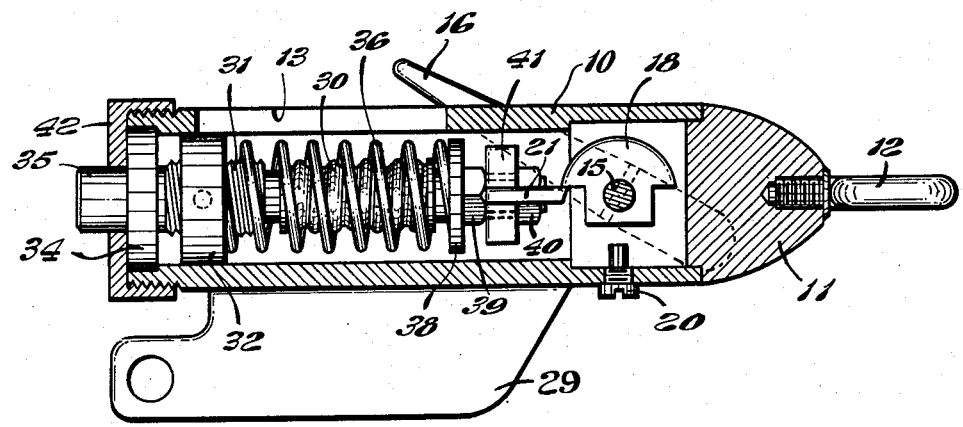
Fig. 3 is a view in longitudinal section at right angles to that of Fig. 1.

The segment 18 is initially set and retained in the position shown in Fig. 3 by a latch 21 in the form of a slide guided for longitudinal movement in ways provided for that purpose in the walls of the shell. In Fig. 3 the latch 21 is shown in operative position holding the shaft with the vanes 16 and 17 downwardly and forwardly inclined, that is to say, in diving position, while the springs 19 are under tension.

The latch 21 is arranged to be retracted or tripped when the device reaches a predetermined depth of submergence by connection with a flexible sheet metal bellows 30 which is responsive to variations in pressure tending to collapse or shorten it as pressure thereon increases. The rear or outer end of the bellows is united by solder or otherwise to a threaded adjusting head 31 carrying a circular nut 32 and held against turning by a pin 33 set in the side wall of the shell 10. The adjusting head includes a disk or collar 34 which is held against longitudinal movement between an internal shoulder in the shell 10 and a cap 42 threaded externally upon the rear end of the shell 10. The adjusting head has also a stud or shank 35 which extends through the cap 42 and is provided with a screw driver slot by which the head and its connected bellows may be rotated and so longitudinally adjusted. The adjusting head also carries a forwardly projecting rod 37 which is disposed concentrically within the bellows 30 and serves to prevent excessive deflection thereof.

The bellows 30 is surrounded by a heavy compression spring 36 which bears at its outer end upon the collar 34 and upon its inner end against a washer 38 located upon a threaded stem attached to the inner end of the bellows and held in place by a nut 39. The latch 21 is apertured and secured to the forward end of the bellows through a connecting bar 41 and nut 40. It will be apparent that when the device reaches a depth at which the liquid pressure collapses or shortens the bellows 30 sufficiently to withdraw the latch 21 from engagement with the segment 18, the springs 19 will rock the shaft segment until the segment encounters the stop 20 and the vanes will be rocked with a snap action from one predetermined position to the other. In this position the vanes will be held in an ascending angle, that is to say, they will be inclined upwardly and forwardly.

In Fig. 4 is shown a diving device of modified and somewhat simplified construction. The body 10 is shown as provided with oppositely disposed longitudinal slots 13 and 14. The shaft 15 in this case carries vanes 28 which are disposed wholly behind the shaft. They are shown in full lines in their descending position and in dot and dash lines in their ascending position to which they move when the segment 18 is released by the latch plate 21. The bellows 23 are carried by a threaded adjusting head 24 having a lock nut 28 and a knurled adjusting stem 25 by which the longitudinal position of the bellows and the latch plate 21 which is connected to the bellows to a stem 22 may be adjusted. The latch plate carries an indicator 26 the outer end of which is movable in the slot 13, and each of the slots is provided with a scale 27 indicating the setting of the bellows and the tripping point of the latch plate in terms of depth of submergence.

In practice the device is connected as a leader with the bathythermograph towed through the aperture provided in the trailing edge of the keel and set with the vanes 16 and 17 at the descending angle suggested in Fig. 3. The device is cast overboard with the bathythermograph, and as the vessel or the towing wire moves ahead, the vanes cause the device to dive abruptly. The diving action continues until the pressure at a predetermined depth collapses the bellows 23 or 30 sufficiently to trip the segment 18. Thereupon the springs 19 are immediately effective to rotate the segment and the shaft 15 substantially 90° in an anti-clockwise direction as shown in Fig. 3, swinging the vanes 16 and 17 into the ascending angle position indicated in dot and dash lines in Fig. 4. When this occurs, the device immediately ascends, bringing the bathythermograph to the surface, whereupon its temperature-pressure record may be inspected, the cycle of operations being very much expedited by the forceful direction imparted by the vanes to the diving device.

Having thus disclosed my invention and described in detail an illustrative embodiment thereof, I claim as new and desire to secure by Letters Patent:

1. An automatic diving device comprising a bullet-shaped hollow body having a transverse shaft journaled therein and extending out through the walls of the body, external vanes fast to the ends of said shaft, a segment fast to the shaft within said body, an adjustable stop mounted in said body and cooperating with the segment to hold the shaft with the vanes at an ascending angle, a spring encircling said shaft and biasing it toward such position, a latch located in the path of movement of the segment and holding the shaft with the vanes at a descending angle, and pressure-responsive bellows connected to said latch.

2. An automatic diving device comprising an elongated body having a towing connection at one end, a pair of external adjustable vanes located behind said towing connection, a spring and stop located within said body and cooperating for holding the vanes at an ascending angle with respect to said body, and pressure-controlled means holding the vanes at a descending angle.

3. An automatic diving device comprising an elongated body having a towing connection at one end, a transverse shaft journaled in said body at the rear of said connection, a pair of external vanes carried by said shaft, a spring connected to the shaft and tending at all times to turn the shaft and said vanes to an ascending angle position, means holding the shaft and vanes in a descending angle position, and adjustable means for determining the depth of submergence at which the spring acts.

4. An automatic diving device comprising an elongated body having a towing connection at one end and adjustable pressure-responsive bellows at the other, a transverse shaft located between the two and external vanes carried by the shaft and angularly movable between two predetermined positions, a torsion spring connected to and operating on the shaft, a latch restraining movement of the shaft, and connections between the latch and bellows for tripping the latch at a predetermined depth of submergence.

References Cited in the file of this patent

UNITED STATES PATENTS

| Number | Name | Date |
| --- | --- | --- |
| 650,758 | Lake | May 29, 1900 |
| 1,181,339 | Norfolk | May 2, 1916 |
| 2,386,950 | Hopkins | Oct. 16, 1945 |
| 2,435,444 | Johansen | Feb. 3, 1948 |
| 2,550,097 | Tindal et al. | Apr. 24, 1951 |

FOREIGN PATENTS

| Number | Country | Date |
| --- | --- | --- |
| 130,350 | Great Britain | Aug. 7, 1919 |